United States Patent
Slijp et al.

(10) Patent No.: US 8,280,300 B2
(45) Date of Patent: Oct. 2, 2012

(54) APPARATUS AND METHOD FOR AUTOMATICALLY ANALYSING A FILLED IN QUESTIONNAIRE

(75) Inventors: Dion F. Slijp, Nijmegen (NL); Jodocus F. Jager, Nijmegen (NL); Peter Kruizinga, Venlo (NL)

(73) Assignee: OCE-Technologies B.V., Venlo (NL)

( * ) Notice: Subject to any disclaimer, the term of this patent is extended or adjusted under 35 U.S.C. 154(b) by 422 days.

(21) Appl. No.: 11/253,671

(22) Filed: Oct. 20, 2005

(65) Prior Publication Data

US 2006/0088812 A1   Apr. 27, 2006

(30) Foreign Application Priority Data

Oct. 21, 2004   (EP) .................................... 04105201

(51) Int. Cl.
G09B 7/00   (2006.01)
(52) U.S. Cl. ......... 434/353; 434/354; 434/362; 434/363
(58) Field of Classification Search .................. 434/324, 434/353, 359, 362
See application file for complete search history.

(56) References Cited

U.S. PATENT DOCUMENTS

| | | | | |
|---|---|---|---|---|
| 2,894,063 A * | 7/1959 | Ridings et al. ................ | 358/438 |
| 3,487,561 A * | 1/1970 | Azure, Jr. et al. ............ | 434/355 |
| 3,599,349 A * | 8/1971 | Albright ........................ | 434/355 |
| 3,601,906 A * | 8/1971 | Roche ............................ | 434/355 |
| 3,643,348 A * | 2/1972 | Azure, Jr. ...................... | 434/353 |
| 3,721,807 A * | 3/1973 | Miller et al. .................. | 434/355 |
| 4,089,124 A * | 5/1978 | Burtis et al. .................. | 434/201 |
| 4,259,788 A * | 4/1981 | Wilson ........................... | 434/338 |
| 4,522,599 A * | 6/1985 | Harte ............................. | 434/339 |
| 5,011,413 A * | 4/1991 | Ferris et al. ................... | 434/358 |
| 5,102,341 A * | 4/1992 | Koslin ........................... | 434/353 |
| 5,229,589 A * | 7/1993 | Schneider ...................... | 235/456 |
| 5,452,379 A | 9/1995 | Poor | |
| 5,459,586 A * | 10/1995 | Nagasato et al. ............. | 358/450 |
| 5,555,101 A | 9/1996 | Larson et al. | |
| 5,694,494 A * | 12/1997 | Hart et al. ..................... | 382/305 |
| 5,775,918 A * | 7/1998 | Yanagida et al. ............. | 434/353 |
| 5,936,225 A * | 8/1999 | Arning .......................... | 235/470 |
| 5,943,137 A | 8/1999 | Larson et al. | |
| 6,079,624 A * | 6/2000 | Apperson et al. ............ | 235/494 |
| 6,175,841 B1 | 1/2001 | Loiacono | |
| 6,600,482 B1 * | 7/2003 | Leone et al. .................. | 345/179 |
| 2001/0033688 A1 * | 10/2001 | Taylor ........................... | 382/181 |
| 2002/0110798 A1 * | 8/2002 | Kucinski et al. ............. | 434/359 |

(Continued)

FOREIGN PATENT DOCUMENTS

JP   50-36545 A   4/1975

(Continued)

*Primary Examiner* — Xuan Thai
*Assistant Examiner* — Bruk Gebremichael
(74) *Attorney, Agent, or Firm* — Birch, Stewart, Kolasch & Birch, LLP (57) ABSTRACT

A method, apparatus and computer software for automatically analysing a filled in questionnaire, are provided. The method includes automatically analysing a filled in questionnaire, the method comprising the steps of: providing a questionnaire having answer locations; scanning at least two copies of the questionnaire with the answer locations filled in differently and complementarily in a predetermined way, to produce a first scan and a second scan; automatically determining answer locations by comparing the first and second scans; providing a filled in questionnaire having certain answers; scanning the provided filled in questionnaire as a third scan; and automatically judging the certain answers with the determined answer locations.

24 Claims, 13 Drawing Sheets

U.S. PATENT DOCUMENTS

| | | | |
|---|---|---|---|
| 2003/0020963 A1* | 1/2003 | Currans | 358/406 |
| 2003/0086116 A1 | 5/2003 | Hall et al. | |
| 2003/0224340 A1* | 12/2003 | Housman et al. | 434/353 |
| 2005/0226541 A1* | 10/2005 | McIntosh et al. | 382/306 |
| 2006/0003306 A1* | 1/2006 | McGinley et al. | 434/350 |

FOREIGN PATENT DOCUMENTS

| | | |
|---|---|---|
| JP | 11-265422 A | 9/1999 |
| JP | 2002-008028 A | 1/2002 |
| JP | 2004-272607 A | 9/2004 |

* cited by examiner

Test

Which country won the European Championship in 2004?
O Netherlands　　O France　　● Greece　　O Spain
　　　　　　　　　　　　　　　�ummary601

What is the capital of Italy?
O Venice　　　● Rome　　　　O Florence　　　O Genua

Which of the following names is not the name of a programming language?
O Pascal　　O Fortran　　O Basic　　● Simm

FIG. 6B

Test

Which country won the European Championship in 2004?
● Netherlands　　● France　　O Greece　　● Spain
　　　　　　　　　　　　　　　　　　　　602

What is the capital of Italy?
● Venice　　　　O Rome　　　　● Florence　　　● Genua

Which of the following names is not the name of a programming language?
● Pascal　　● Fortran　　● Basic　　O Simm

FIG. 7A

Test

Which country won the European Championship in 2004?
O Netherlands    O France    O Greece    ● Spain

What is the capital of Italy?
O Venice    ● Rome    O Florence    O Genua

Which of the following names is not the name of a programming language?
● Pascal    O Fortran    O Basic    O Simm

FIG. 7B

704 — Test result: 3.3
(1 out of 3 correct)

Test

Which country won the European Championship in 2004?
O Netherlands    O France    O Greece    O Spain
                    701         702

What is the capital of Italy?
O Venice    O Rome    O Florence    O Genua
            703

Which of the following names is not the name of a programming language?
O Pascal    O Fortran    O Basic    O Simm

Questionnaire

What is your age?
○ <18   ○ 19-25   ○ 26-35   ○ 36-55   ○ >56

What is your monthly income?
○ 0-10000   ○ 10000-25000   ○ 25000-50000   ○ 50000-100000

Please fill in your favourite color.
○ yellow   ○ blue   ○ red   ○ other color

Do you like to watch soccer?
○ yes   ○ no

FIG. 11B

Questionnaire

What is your age?
● <18   ● 19-25   ● 26-35   ● 36-55   ● >56

What is your monthly income?
● 0-10000   ● 10000-25000   ● 25000-50000   ● 50000-100000

Please fill in your favourite color.
● yellow   ● blue   ● red   ● other color

Do you like to watch soccer?
● yes   ● no

FIG. 12A

Questionnaire

What is your age?
O <18  ● 19-25  O 26-35  O 36-55  O >56

What is your monthly income?
● 0-10000  O 10000-25000  O 25000-50000  O 50000-100000

Please fill in your favourite color.
O yellow  ● blue  O red  O other color

Do you like to watch soccer?
O yes  ● no

FIG. 12B

Questionnaire

What is your age?
O <18  O 19-25  O 26-35  O 36-55  ● >56

What is your monthly income?
O 0-10000  O 10000-25000  O 25000-50000  ● 50000-100000

Please fill in your favourite color.
O yellow  O blue  O red  ● other color

Do you like to watch soccer?
● yes  O no

FIG. 12C

Questionnaire

What is your age?
O <18  O 19-25  ● 26-35  O 36-55  O >56

What is your monthly income?
O 0-10000  ● 10000-25000  O 25000-50000  O 50000-100000

Please fill in your favourite color.
O yellow  ● blue  O red  O other color

Do you like to watch soccer?
● yes  O no

FIG. 12D

Questionnaire

What is your age?
O <18  O 19-25  O 26-35  ● 36-55  O >56

What is your monthly income?
O 0-10000  O 10000-25000  ● 25000-50000  O 50000-100000

Please fill in your favourite color.
O yellow  O blue  ● red  O other color

Do you like to watch soccer?
O yes  ● no

FIG. 12E

Questionnaire

What is your age?
O <18  O 19-25  ● 26-35  O 36-55  O >56

What is your monthly income?
● 0-10000  O 10000-25000  O 25000-50000  O 50000-100000

Please fill in your favourite color.
● yellow  O blue  O red  O other color

Do you like to watch soccer?
O yes  ● no

FIG. 12F

Questionnaire

What is your age?
O <18  ● 19-25  O 26-35  O 36-55  O >56

What is your monthly income?
O 0-10000  O 10000-25000  ● 25000-50000  O 50000-100000

Please fill in your favourite color.
O yellow  ● blue  O red  O other color

Do you like to watch soccer?
O yes  ● no

FIG. 13

Overview inquiry results

Questionnaire

What is your age?
0% <18   33% 19-25   33% 26-35   16% 36-55   16% >56

What is your monthly income?
33% 0-10000  16% 10000-25000   33% 25000-50000   16% 50000-100000

Please fill in your favourite color. ⟵ 1302
16% yellow   50% blue   16% red   16% other color

Do you like to watch soccer?
33% yes   66% no

1301

APPARATUS AND METHOD FOR AUTOMATICALLY ANALYSING A FILLED IN QUESTIONNAIRE

This application claims the benefit of the European Patent Application No. 04105201.0 filed on Oct. 21, 2004, which is hereby incorporated by reference.

BACKGROUND OF THE INVENTION

1. Field of the Invention

The invention relates to an apparatus and a method for automatically analysing a filled in questionnaire. The invention also relates to a digital copier incorporating such an apparatus. The invention is applicable to a questionnaire that could be for example a test or an inquiry.

2. Discussion of the Background Art

The use of a questionnaire is common in environments such as training students during education, measuring consumer needs for a marketing study, and measuring the preferences of a group of people.

A questionnaire workflow generally comprises the steps of preparing a questionnaire, distributing the questionnaire, filling in the questionnaire, collecting the filled-in questionnaire and analysing the questionnaire. This workflow can be partly on paper or can be implemented digitally. A paper questionnaire provides an easy user interface and a digital questionnaire provides the possibility of automation and fast distribution.

To date, the approach in producing educational materials for computers has been highly inefficient and expensive. Often people read, fill in and analyse questionnaires on paper, such as in education programs where questions are presented and answers are filled in. To make changes, a teacher revises multiple-choice tests on paper with pencil. This is a tedious process for the teacher: it takes a lot of his time and a lot of his concentration, which can cause feelings of frustration.

U.S. Pat. No. 6,175,841, to Loiacono, discloses a questionnaire workflow. This method and apparatus is for transforming educational materials composed of questions and answers into an on-line computer. By scanning papers of textual and/or graphical material sometimes containing pencil lines, computer readable images are created. The captured images are modified by the application of answer formats, examples of that include underlining, highlighting, and circling a correct answer. The modified captured images are stored for distribution to users. Answer formats are automatically applied to the questions thus allowing them to be answered in a computer interactive form. A disadvantage of such a system, however, is that it requires a difficult and time consuming configuration process in preparing an on-line interactive questionnaire.

Another example of such a method and system is known from U.S. Pat. No. 5,555,101 to Larson and Faul. This method and system is for interactively creating forms, including displaying the forms during creation and interpreting completed forms received via a facsimile device. The system includes the following features: automated reminder, automated data export, suspense processing and automated confirmation. A disadvantage of such a system, however, is also that it requires a difficult and time consuming configuration process in preparing an on-line interactive form.

That is, a major drawback of the background art for automatically analysing a filled in paper questionnaire is that it requires a difficult and time consuming configuration process in the preparation of the automatic analysing process for filled in paper questionnaires.

SUMMARY OF THE INVENTION

To overcome drawbacks of the background art, it is an object of the present invention to reduce the time needed to configure the automatic analysing process for filled in questionnaires. This is achieved by a method in which the method according to an embodiment comprises the following steps:
a) providing a questionnaire having answer locations,
b) scanning at least two copies of the questionnaire with the answer locations filled in differently and complementarily in a predetermined way,
c) automatically determining answer locations by comparing the scans,
d) providing a filled in questionnaire having answers,
e) scanning the filled in questionnaire to a third scan, and
f) automatically judging the answers with the answer locations.

This method is based upon the observation that paper provides the best user interface for the configuration process for automatically analysing a filled in paper questionnaire. This method works for any questionnaire on paper, such as free-form hand-written questionnaire or a print made from an application running on a computer containing a digital document. Thus, the invention provides an intuitive and easy way to configure the automatically analysing of a filled in paper questionnaire.

By filling in the questionnaires differently and complementarily in the above step (b), i.e., such that the filled-in answer locations of the two copies together precisely form the entire set of answer locations, the answer locations are uniquely defined and can unambiguously be found by comparing the two scans.

With a first embodiment, an operator—for example a teacher—configures the automatic analysing process for filled in paper questionnaires such as a multiple-choice test. The teacher copies the unfilled questionnaire to distribute to students for testing and makes two additional copies. The two additional copies are used to generate a first master and a second master, respectively.

The teacher indicates all correct answers on the first additional copy, which is designated as the first master, and indicates all wrong answers on the second additional copy, which is designated as the second master. The teacher scans the first master and second master on an apparatus incorporating the invention such as a digital copier or a scanner connected to a personal computer.

In this first embodiment, according to the invention, the method comprises the steps of: automatically determining answer locations by comparing a first scan and a second scan, where one of the first and second scans is made from the questionnaire with all correct answers filled in and the other scan is made from the questionnaire with all wrong answers filled in; and automatically labelling every answer location as a correct answer or a wrong answer.

In a further embodiment, according to the invention, the method comprises the steps of: finding all answers on a third scan by using the answer locations, deciding per answer whether the answer is a wrong answer or a correct answer based upon the label of the answer location, and creating a corrected questionnaire.

With this embodiment, the operator starts the analysing process of the filled in paper questionnaires by scanning in all filled in paper questionnaires. Thereafter the method finds all filled in answers on the third scan by using the answer locations. All questions are found by grouping together answer locations based upon spatial information such as distance between answer locations or a typical spatial positioning of the answer locations. The labels indicate the wrong and correct answer positions. For example, when the answer location on the third scan contains an answer and the answer location label indicates 'wrong', then this filled in answer is wrong. This way the correct and wrong answers per question are known and a corrected questionnaire is automatically created.

With a second embodiment, an operator, for example a marketer, can configure the automatic analysing process for the filled in paper questionnaire such as an inquiry.

The marketer makes a number of copies from the original questionnaire needed to inquire a group of people, and makes two additional copies. The two additional copies are used to create the first master and the second master, respectively. The marketer indicates all possible answers on the first additional copy to create the first master, and the marketer creates the second master, which is the second additional copy of paper questionnaire that has not been filled in. The marketer scans the first master and second master on an apparatus incorporating the invention such as a digital copier or a scanner connected to a personal computer.

In this second embodiment, according to the invention, the method comprises the step of automatically determining answer locations by comparing a first scan and a second scan, where one of the first and second scans is made from the questionnaire with all answers filled in and the other scan is made from the questionnaire with no answers filled in.

In a further embodiment, according to the invention, the method comprises the steps of: finding all answers on a third scan by using the answer locations and creating an overview of a plurality of third scans comprising a distribution of answers. The inquiry is automatically processed resulting in an overview.

The invention is explained with reference to the following exemplified embodiments of the present invention and is illustrated by reference to the drawings. These embodiments serve to illustrate the invention and should not be regarded as a limitation thereof.

BRIEF DESCRIPTION OF THE DRAWINGS

The invention is explained in detail with reference to preferred embodiments accompanying drawings wherein.

DETAILED DESCRIPTION OF THE PREFERRED EMBODIMENTS

Figure 1:
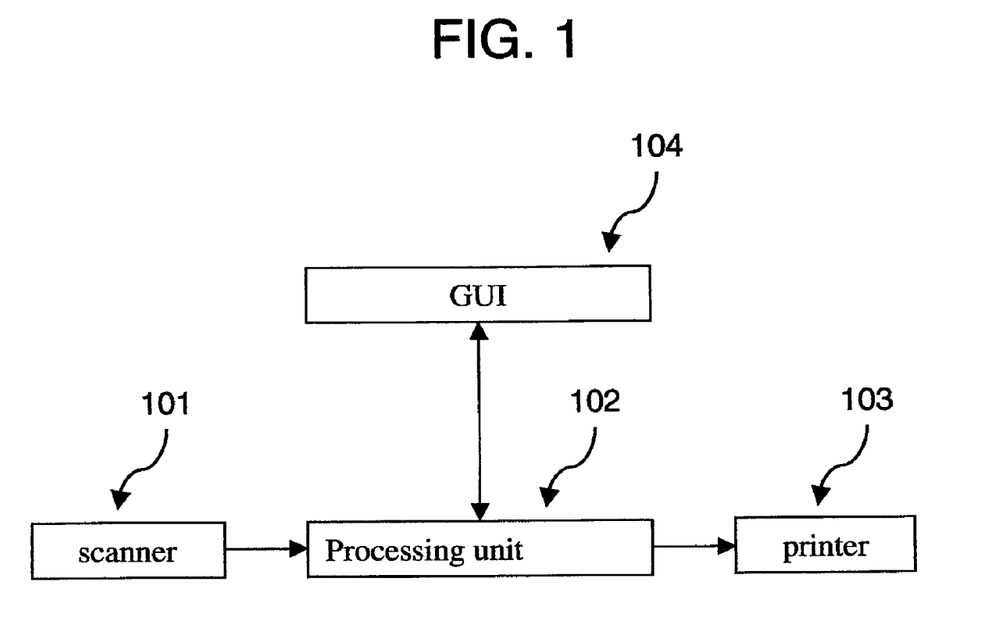
FIG. 1 shows an apparatus according to the present invention.

FIG. 1 illustrates an embodiment of an apparatus or system for automatically analysing a filled in paper questionnaire or the like, according to the present invention.

The apparatus/system comprises a scanner (101), a processing unit (102) and possibly with means (104) for interacting with the processing unit, to give response to an operator and a printer (103), all operatively coupled. The basic apparatus has a scanner connected with the processing unit (102) such as a computerised system. The more advanced apparatus comprises an operator console or GUI (104) that provides the user interface to the system according to the invention. The operator console (104) contains a display and data entry means, such as those available for a personal computer or laptop.

The scanner (101) scans in a first master, a second master, and a filled in questionnaire, and the scanned images are sent to the processing unit (102). The first master, the second master and the filled in questionnaire have the same original questionnaire as the basis. A method executed by the processing unit (102) determines the answer locations automatically by comparing a first scan, (derived from the first master), and a second scan, (derived from the second master), and automatically judges a third scan (derived from the filled in questionnaire), based upon answer locations.

Many variations of the system are possible. In a first variant, all components of FIG. 1 are incorporated into a digital copier. In a next variant, the scanner (101), the processing unit (102) and possibly the printer (103) are remotely connected separate devices. In the latter case, the processing unit 102 may be embodied in a PC or workstation.

Figure 2:
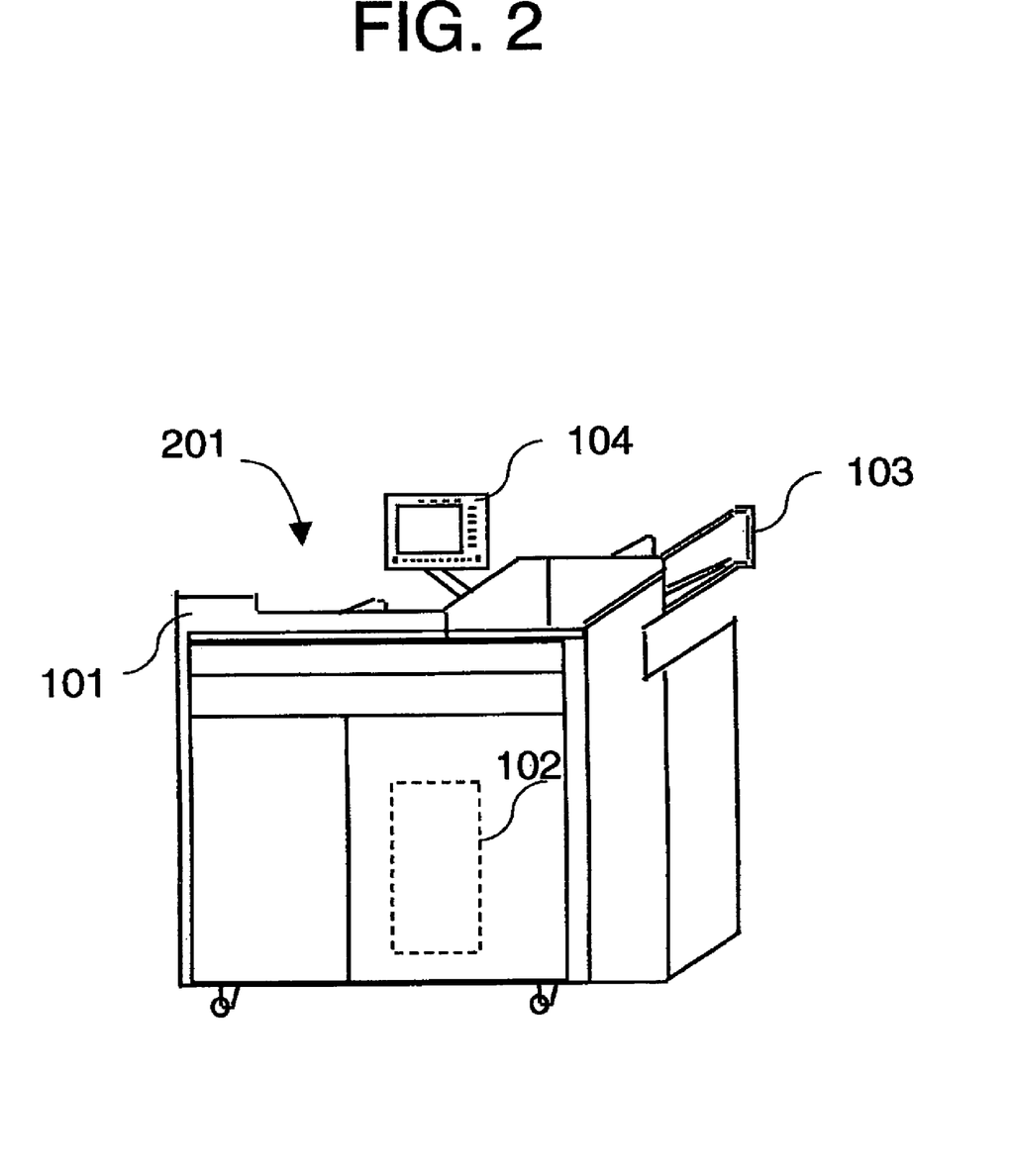
FIG. 2 shows a digital copier according to the present invention.

FIG. 2 illustrates a block diagram of an embodiment of a digital copier (201) according to the present invention. Such a digital copier incorporates the apparatus of FIG. 1 and thus comprises a scanner (101), a processing unit (102) such as a controller and possibly with means (104) for interacting with the computerised system and possibly a printer (103).

Figure 3:
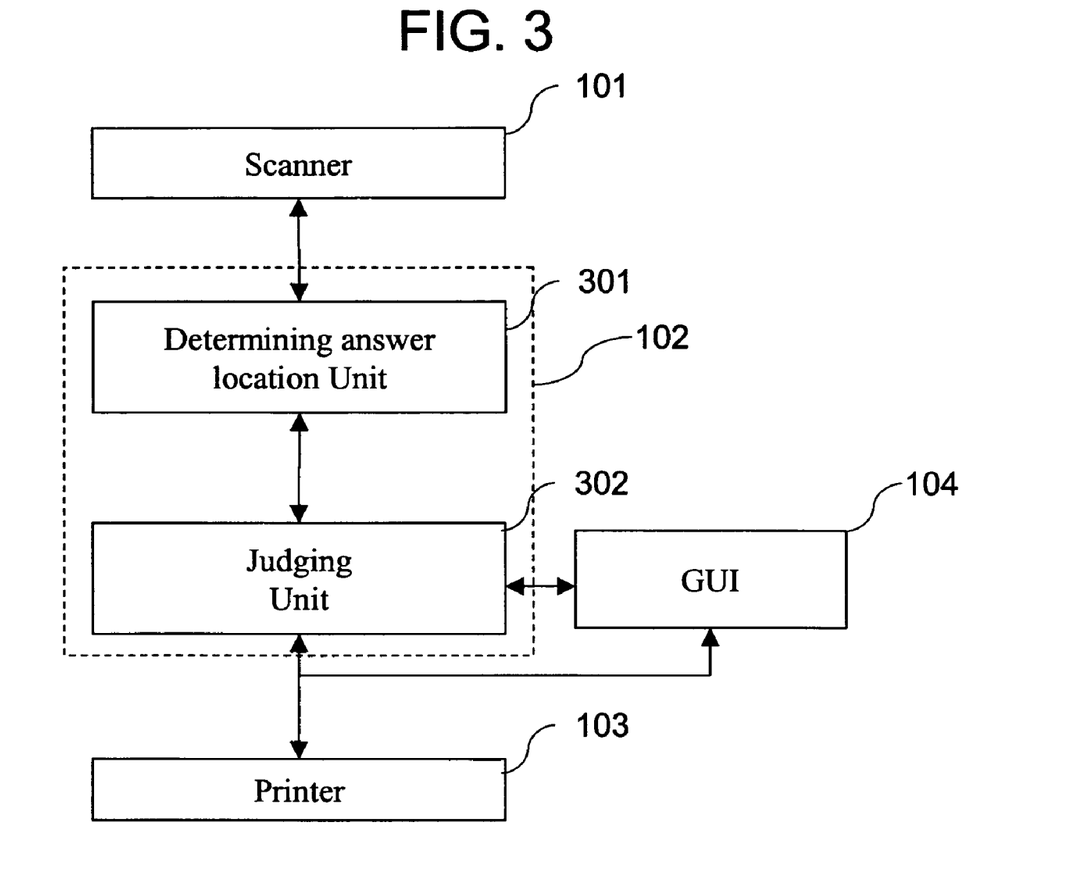
FIG. 3 shows functional blocks of the apparatus according to the present invention.

FIG. 3 illustrates a detailed block diagram of the apparatus of FIG. 1 according to the present invention. The processing unit 102 can include a determining answer location unit 301 and a judging unit 302. The scanner (101) converts the first and second master to respectively the first scan and second scan and converts the filled in questionnaire to the third scan.

The first, second and third scan are transported to the determining answer locations unit (301) comprising the image pre processing which aligns the first, second scan and third scan, removes equal information between the first scan and the second scan from both the first and second scan, identifies on the first and the second scan the answer locations and labels the answer locations differently based upon being part of a first set or a second set. The answer locations with their labels and the third scan are transported to the judging unit (302) which derives questions, finds questions with problems such as that no answer is filled in for this question. The judging unit (302) communicates the found problems to the operator via a human interface such as an operator panel or graphical user interface (104). The judging unit (302) gives a test result and/or test mark to the third scan based upon the answer locations with their labels and makes a summary of the results. Possibly, the printer (103) and/or another human interface (104) will convert the judged questionnaire and the summary of the results to a readable form.

Figure 4:
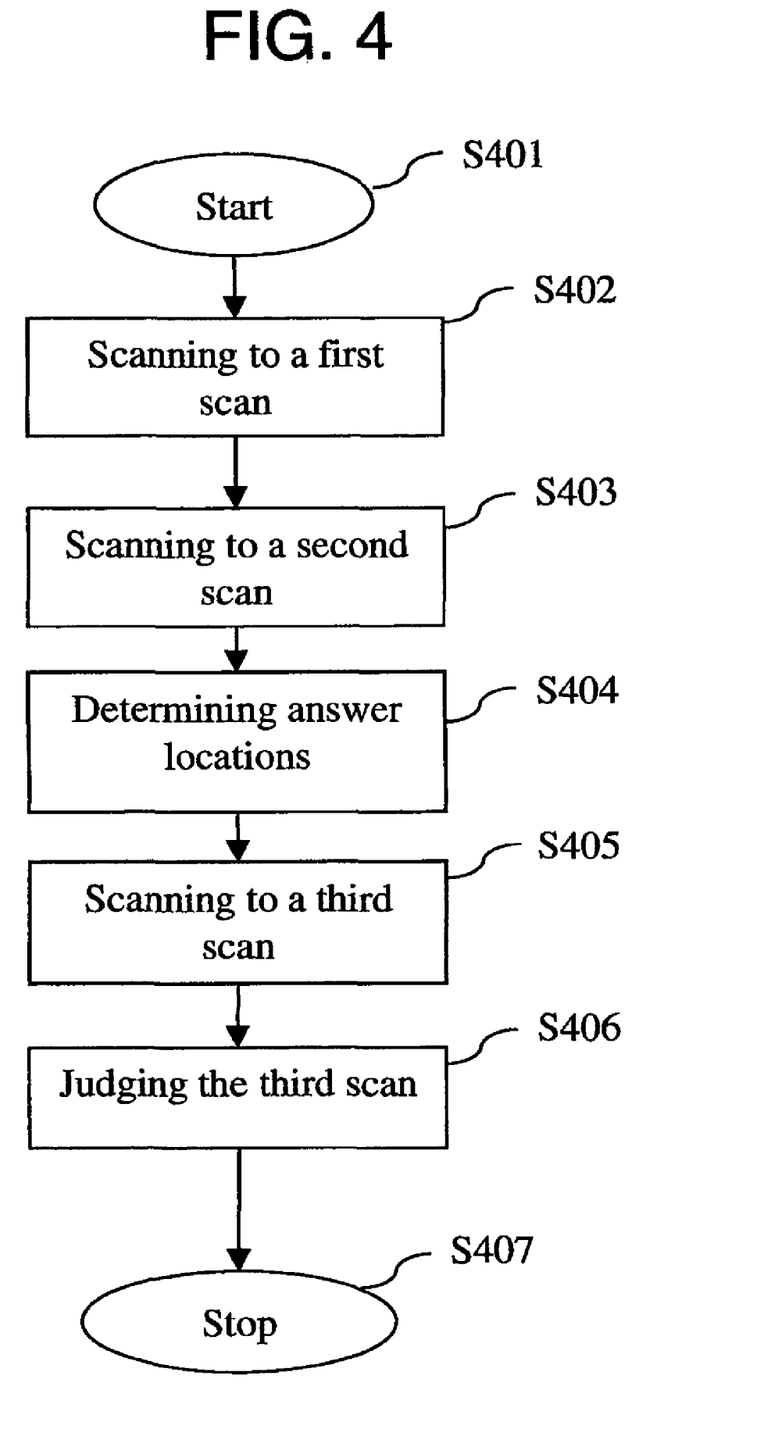
FIG. 4 shows a flow diagram of a method for automatically analysing a filled in paper questionnaire according to the present invention.

FIG. 4 illustrates a flow diagram of an embodiment of the method for automatically analysing a filled in paper questionnaire or the like according to the present invention. This method can be implemented in the apparatus of FIG. 1, in the digital copier or FIG. 2, or in other suitable device/system.

Starting from the starting position S401, in step S402 the first master is scanned on scanner (101) as a first scan. At step S403 the second master is scanned on scanner (101) as a second scan. The first and second masters can be the same paper questionnaires filled out in different and complimentary ways as discussed above. At step S404 the answer locations on the questionnaire are automatically determined by comparing the first scan and the second scan. By comparing the scans, the determining answer location unit 301 determines which answer locations are filled in on the first master and are not filled in on the second master and vice versa.

However, because the scanner document feeder is not perfect, the first scan is aligned with the second scan before the first and second scans are compared. The alignment of the scans can be done in several ways as described in the art. One way of alignment is creating a projection profile of the first scan and second scan, by adding all black pixels in each row for the vertical profile and all back pixels in each column for the horizontal profile, from the long and the short side of the scans. By comparing the vertical and horizontal profiles, the misalignment in the number of pixels can be determined and corrected by shifting one of the first and second scans so that both profiles are matching closely. Thereafter the algorithm of the unit 301 determines the answer locations on the questionnaire by removing all equal information between the first and the second scans from the first and second scans using for example an area-by-area comparison. Thereafter a connected component analysis is performed on both the first and second scans to find the boundary of the answer locations, and finally all small components are removed from both the first and second scans as they are considered to be noise. Now, all answer locations are found on both the first and second scans. Finally, all answer locations are labelled.

An example for labelling in case of an inquiry is a questionnaire for measuring information derived from a certain group of people. For such a questionnaire, the first master is the questionnaire with all answers filled in and the second master is the questionnaire with no answers filled in. In case one of the masters has no answer locations at all, all found answer locations on the other master must be labelled as correct.

An example for labelling in case of a test is a multiple-choice test. Then, the scan (first or second scan) with the higher number of answer locations contains all wrong answer locations and so these answer locations are labelled as wrong answers. The scan (first or second scan) with the lower number of answer locations contains all correct answers and so these answer locations are labelled as correct answers.

An alternative approach is that the label selection is based upon a selection means for an operator, indicating whether the first master or the second master is scanned or the label selection is predetermined such that the first master is always scanned before the second master or visa versa.

In the next step S405 a questionnaire such as a filled-in questionnaire is scanned in as a third scan. In step S406, the third scan is then automatically judged based upon the answer locations determined at step S404. Finally, the method stops in step S407.

The person trained in the art will understand that an embodiment of the invention is capable in handling both: a questionnaire for inquiring a distribution of answers made for each of the answers for measuring information derived from a certain group of people and a questionnaire for testing a certain group of people.

Figure 5A:
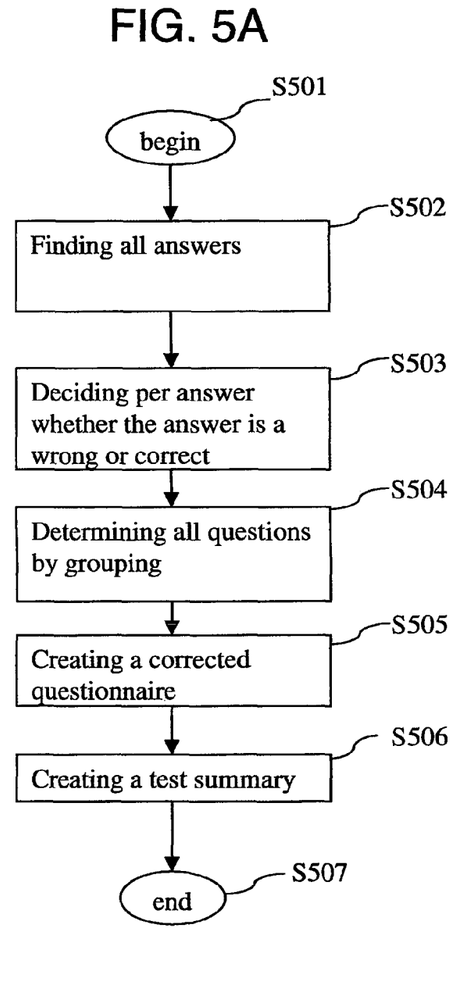
FIG. 5A shows a flow diagram of the method for automatically judging the third scan based upon the answer location of a filled in test according to the present invention.

FIG. 5A illustrates a flow diagram of a first embodiment of the invention for automatically judging the third scan based upon the answer location, which is part of step S406 of FIG. 4. This flow diagram illustrates a part of automatically judging a test. Starting from the starting position S501, in step S502 a filled in paper questionnaire is scanned on scanner (101) to find all answers on the third scan by using the answer locations. This can be done, for example, by determining the coverage. The coverage is the percentage of black pixels of all pixels in an answer location of the third scan. To determine if a person has selected the answer on the third scan, the coverage is calculated per answer location on the third scan. When the coverage for an answer location exceeds a certain threshold such as a certain percentage, then it is automatically determined that this answer is filled in. Thereafter in step S503, it is decided per answer location, whether the filled in answer or not filled in answer is a wrong or correct answer based upon the label of the answer location.

After done so, in step S504, all questions are determined by grouping together answer locations based upon spatial information. Before this step, only the notion of answers exists without knowing to which question the answers belong. Without this step, it is not possible to judge the questionnaire. When, after determination of a question, a problem for this question is detected such as 'no answer is given' or 'too many answers are filled in'. Then this problem is presented to the operator. In such a case, the operator will select by appropriate means one of the following: the intended answer, 'no answer is filled in' or 'too many answers are filled in'. Thereafter the embodiment of the invention decides per answer whether it is correct or wrong and/or determines per question whether the question is answered correctly or wrongly. From this, the test result can be derived. Step S505 creates a corrected questionnaire by overlaying the third scan with a correction symbol and a test result and/or test mark. Possibly, an extra step S506 can be available. In this step, a test summary is automatically created which comprises the test results and/or test marks of all third scans. Thereafter the flow diagram stops in step S507.

Figure 5B:
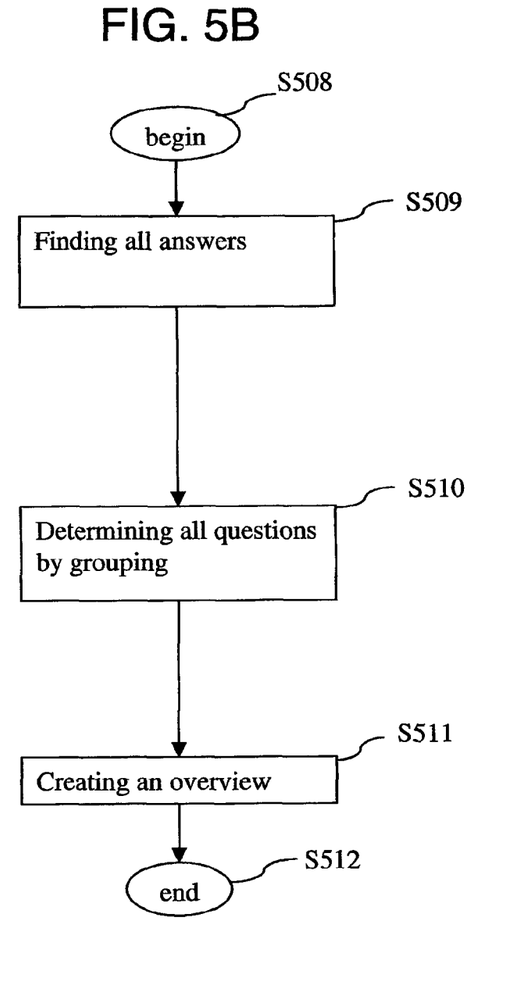
FIG. 5B shows a flow diagram of the method for automatically judging the third scan based upon the answer location of a filled in inquiry according to the present invention.

FIG. 5B illustrates a flow diagram of a second embodiment of the invention for automatically judging the third scan based upon the answer location, which is part of step S406 of FIG. 4. This flow diagram illustrates a part of automatically judging an inquiry. Starting from the starting position S509, in step S510 the filled in paper inquiry is scanned on scanner (101) to find all answers on the third scan by using the answer locations. All filled in answers are labelled as correct answers. Possibly, in an extra step S510, all questions are determined by grouping together answer locations based upon spatial information. After determination of a question, a problem can appear such as 'no answer is given' for this question. This problem is presented to the operator. In such a case, the operator will select, by means of an operator panel, the intended answer. In step S511 the third scan is overlaid with a distribution of answers made for each of the answers. Overlaid on the answer location is the selection percentage of an answer with respect to all filled in inquiries. It will be clear that step S510 is an enhancement so step S510 is not necessary to be able to create the overview in step S511

EXAMPLES

To illustrate the operation of the method according to the present invention some examples are given below.

Example 1

Figure 6A:
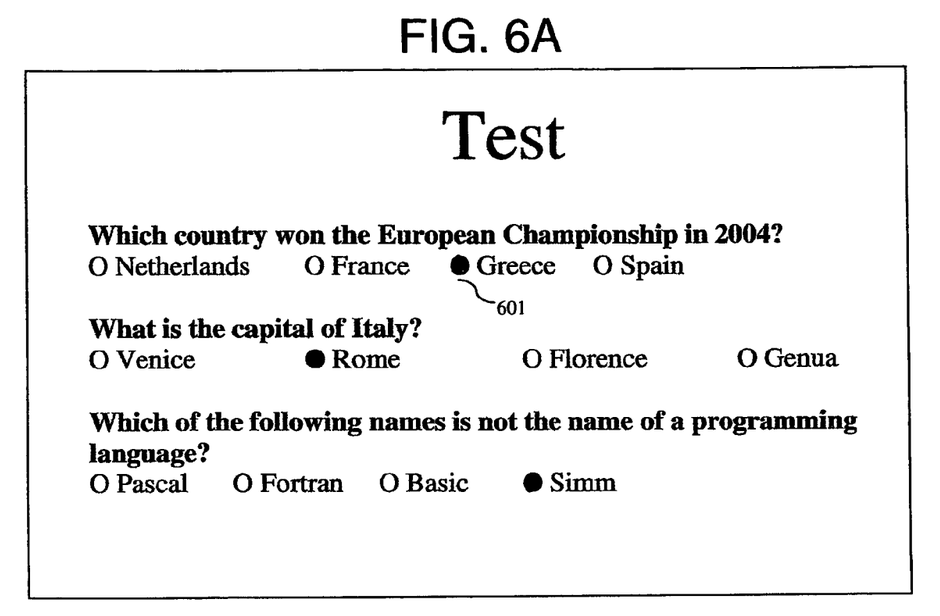
FIG. 6A shows an example of a multiple choice test in which all correct answers are filled in, the so called first master, according to the present invention.
Figure 6B:
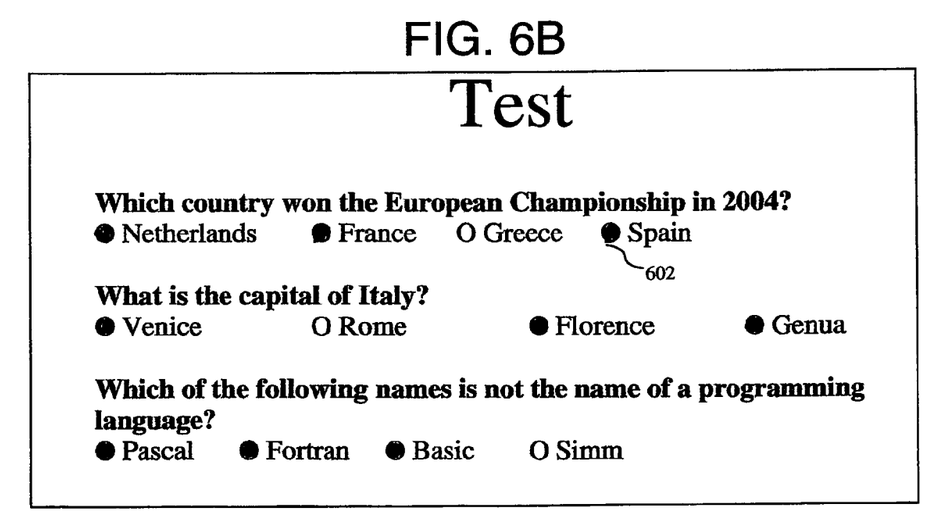
FIG. 6B shows an example of a multiple-choice test in which all wrong answers are filled in, the so-called second master, according to the present invention.

FIG. 6A is an example of a multiple-choice test in which correct answers (601) are filled in on paper, the so-called first master. In FIG. 6B the second master, where all wrong answers (602) are filled in on paper, is shown. Both the first and second masters are then scanned (101) and handled by image processing in the determining answer location unit (301) resulting in finding all possible answer locations.

Figure 7A:
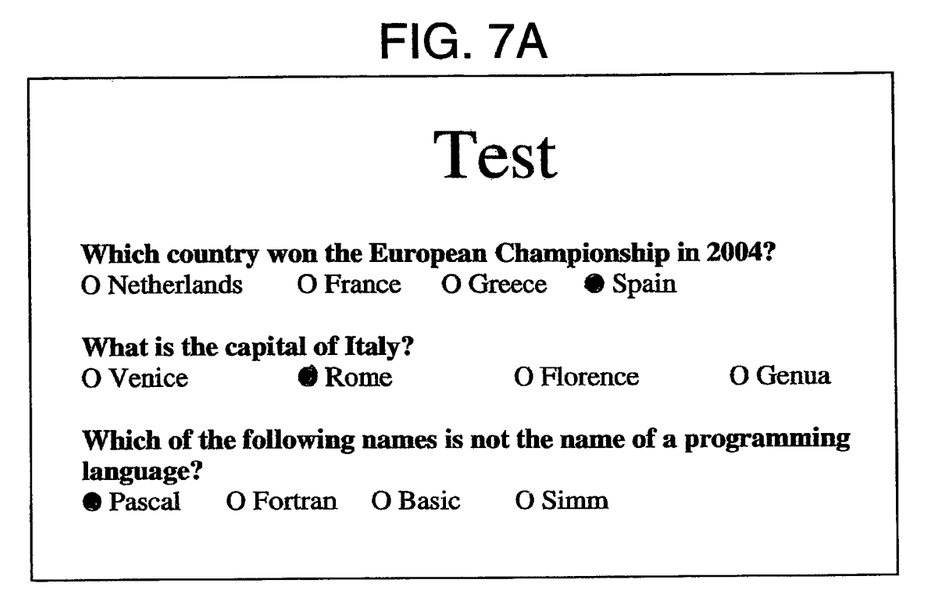
FIG. 7A shows an example of a questionnaire in which the student's answers are filled in according to the present invention.
Figure 7B:
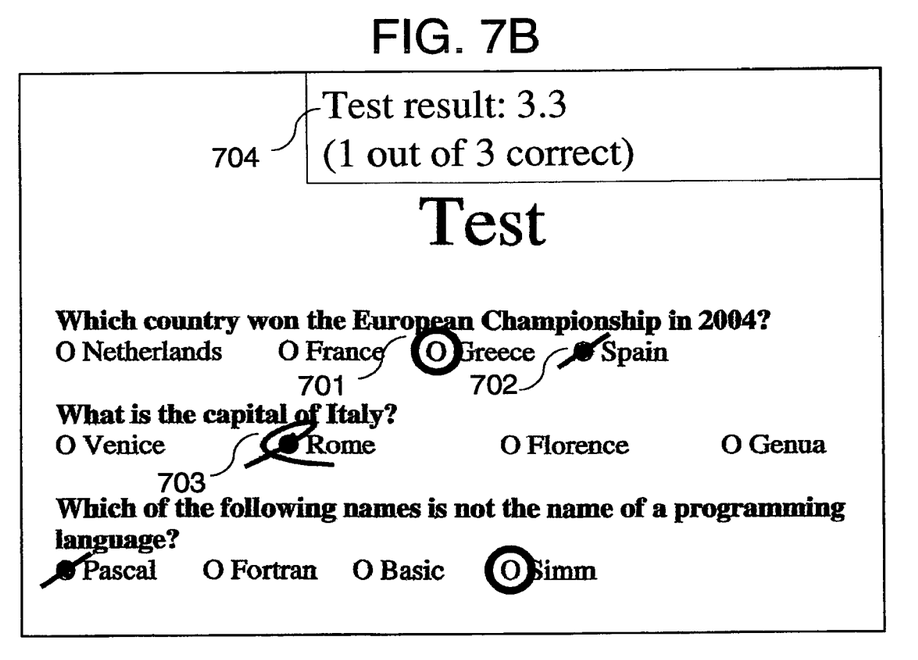
FIG. 7B shows an example of a corrected questionnaire according to the present invention.

FIG. 7A is an example of a filled in multiple choice test— filled in questionnaire. The filled in questionnaire is scanned (step S405) and automatically judged (step S406) resulting in a corrected questionnaire (i.e., a questionnaire marked up with corrections) (step S505). In FIG. 7B, an example of the corrected questionnaire is shown. Examples of correction symbols that could be used on the corrected questionnaire are 'this should be the answer'-symbol (701), 'this is not the correct answer'-symbol (702), and 'the correct answer is filled in'-symbol (703). Furthermore, the test result (704) can be overlaid on the third scan.

Example 2

Figure 8:
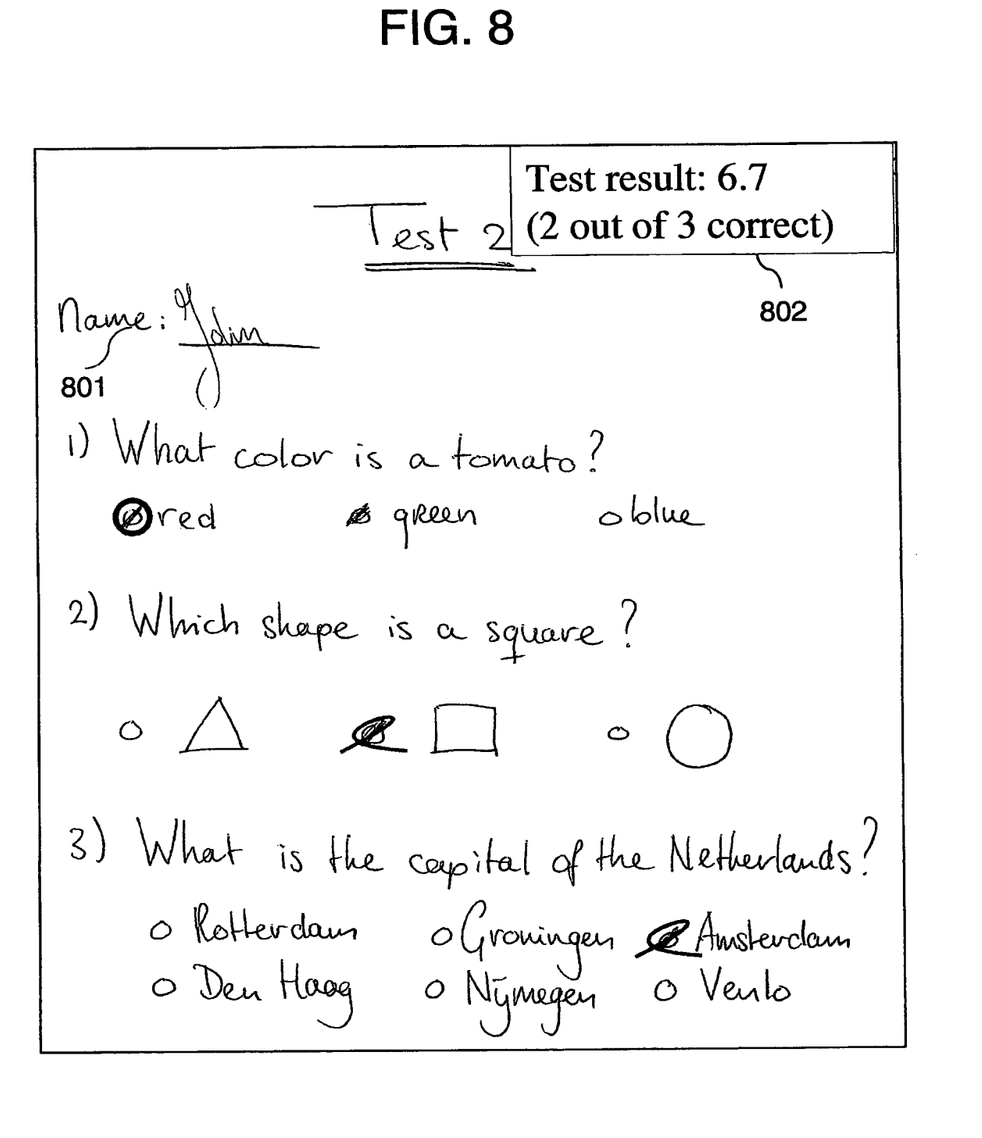
FIGS. 8 and 9 present examples of hand-written form-free corrected questionnaires according to the present invention.
Figure 9:
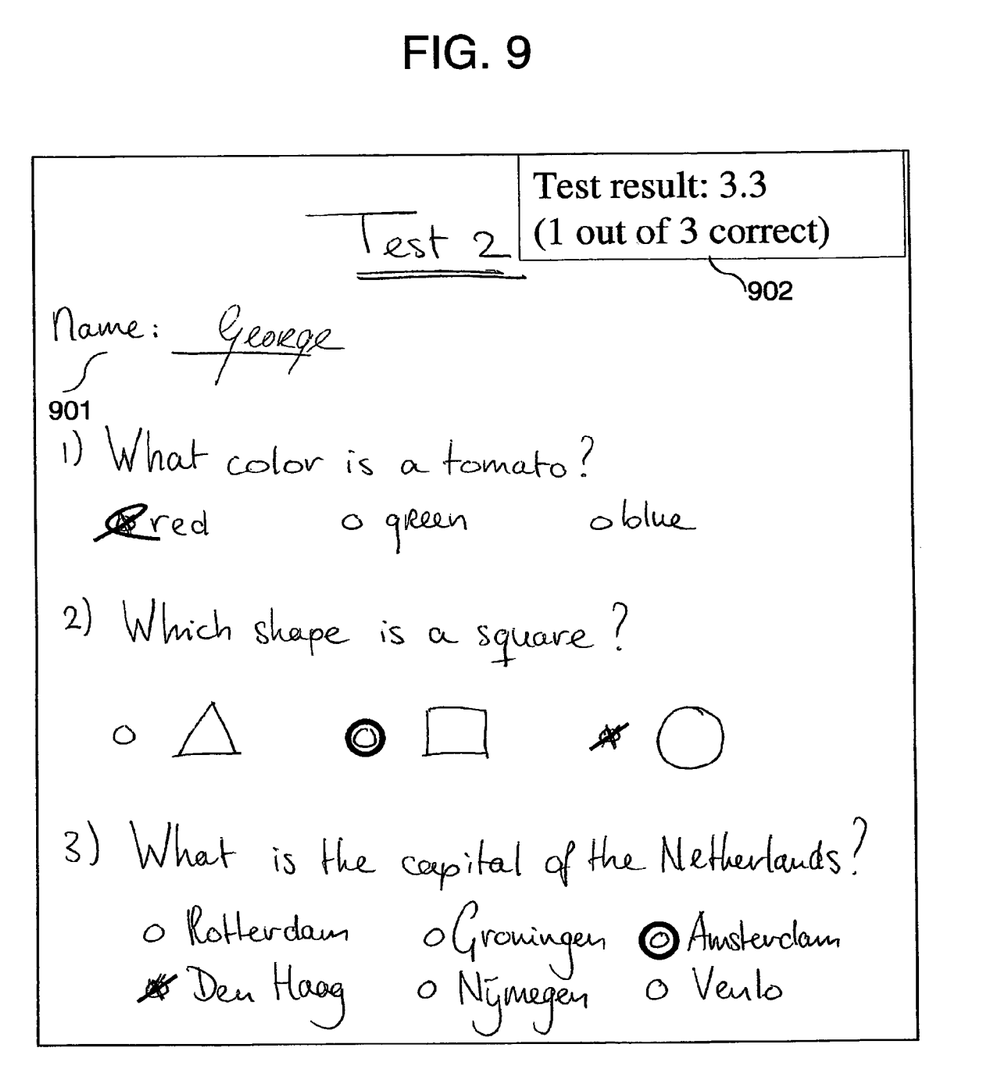

FIGS. 8 and 9 examples involve hand-written form-free questionnaires. These are examples of embodiments of the invention illustrating that any form of questionnaire can be judged by the invention, without the need that an operator digitally configures the configuration process. The questionnaire of FIG. 8 is filled in on paper by John (801). John has a test result of 6.7 due to 2 answers being correct out of 3 (802).

Incorporated in the embodiment(s) of the invention is the possibility to have two correct answers for one question. For example, the first question in FIG. 8 has two correct answers: a ripe tomato is red and a growing tomato is green. Depending on the scoring model, score points are given for example per correct answer, per correct answers, are not wrong answers, or per correct question.

The questionnaire of FIG. 9 is filled in on paper by George (901). George has a test result of 3.3 due to 1 answer being correct out of 3 (902). Several such questionnaires are filled in and processed, resulting in a test summary.

Figure 10:
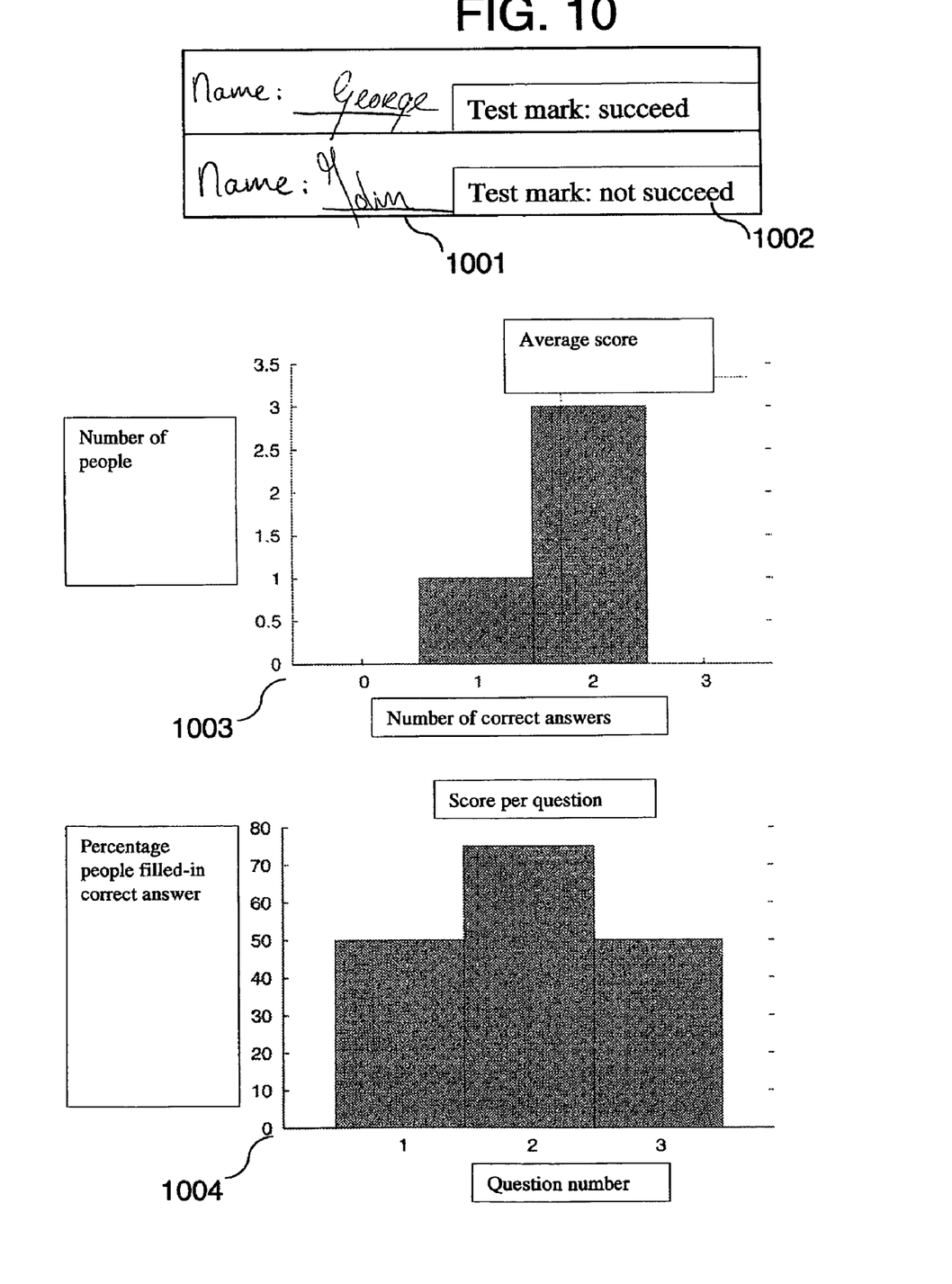
FIG. 10 shows an example of a test summary according to the present invention.

FIG. 10 is an example of a test summary shown. Scan parts containing the names of George and John are shown (1001), which is combined with an example of test marks (1002). The statistics overview could comprise for example the number of correct answers related with the number of people (1003), or the percentage of people that filled in the correct answer related with the question number (1004).

Example 3

Figure 11A:
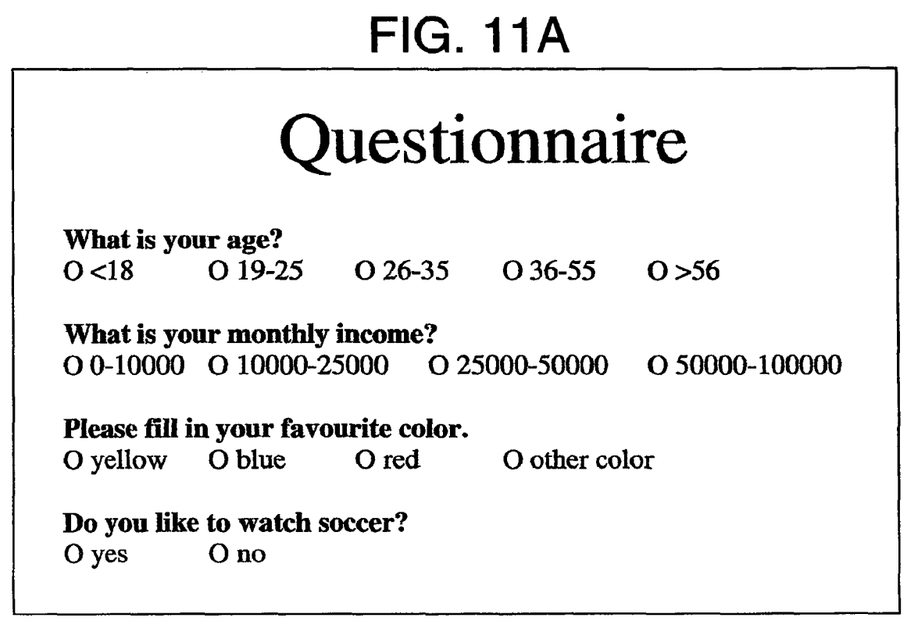
FIG. 11A shows an example of a questionnaire according to the present invention.
Figure 11B:
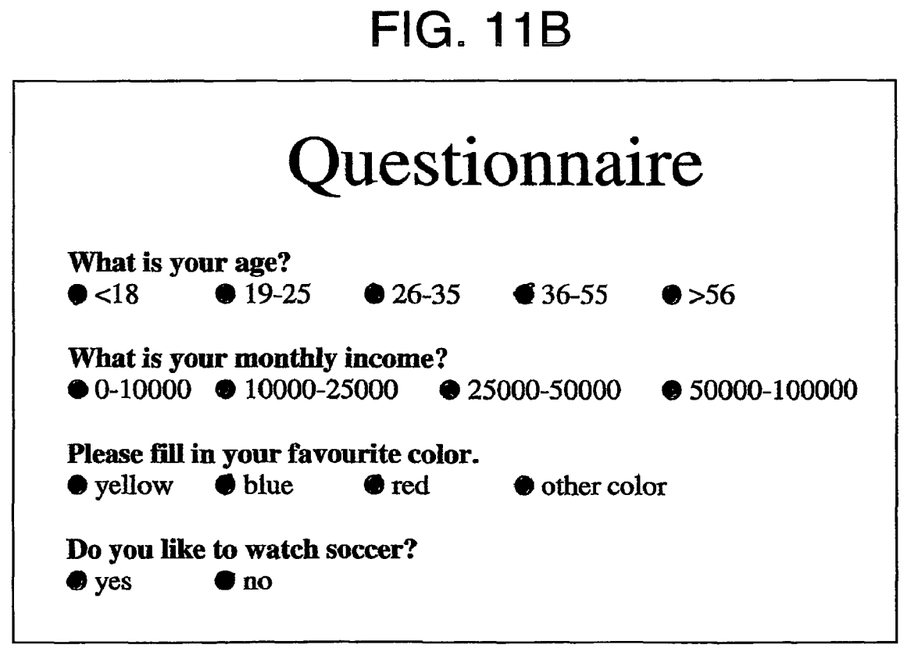
FIG. 11B shows an example of a questionnaire in which all answers are filled in on paper, the so-called second master, according to the present invention.
Figure 12A:
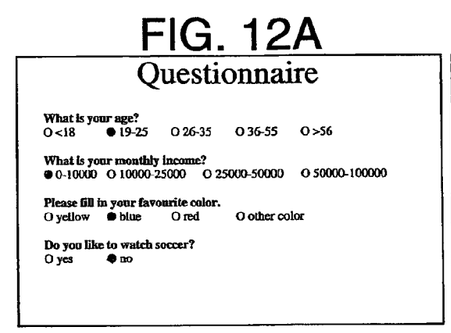
FIGS. 12A-12F show an example of filled in paper questionnaires of a group of people according to the present invention.
Figure 12B:
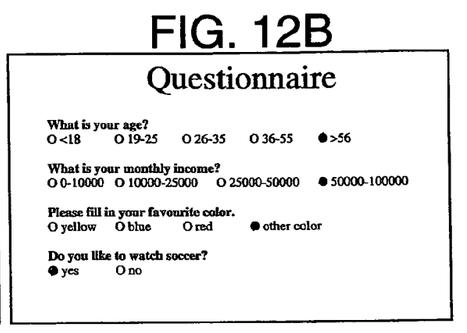
Figure 12C:
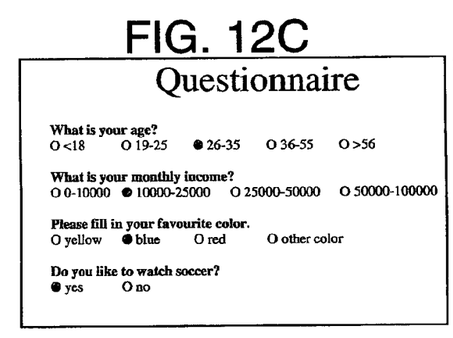
Figure 12D:
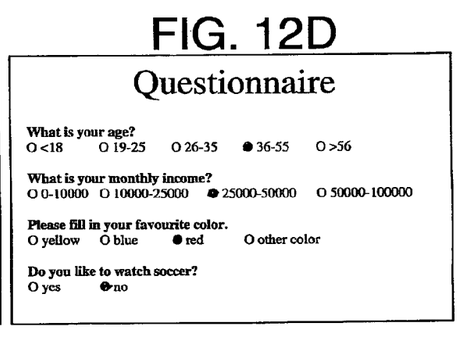
Figure 12E:
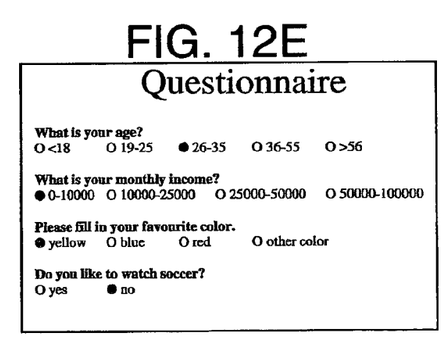
Figure 12F:
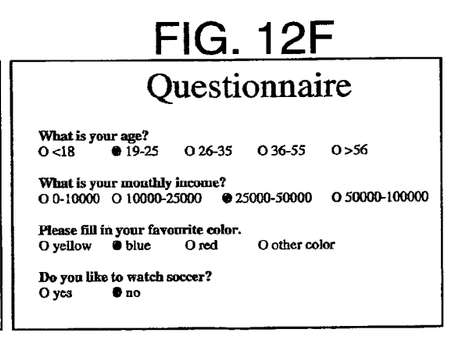
Figure 13:
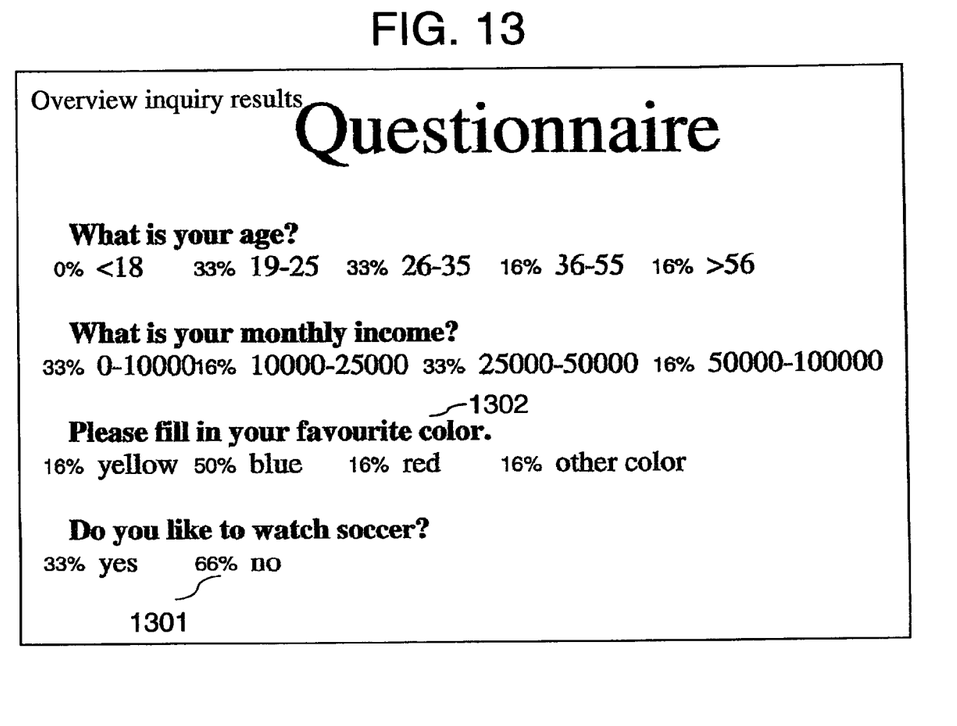
FIG. 13 shows an example of a distribution of answers made for each of the questions that is overlaying the third scan, in association with the questionnaires of FIGS. 12A-12F according to the present invention.

The configuration process is done partly on paper by using the inquiries of FIGS. 11A and 11B. FIG. 11A is an example of an inquiry in which no answers are filled in. In FIG. 11B all answers for this inquiry are filled in on paper. In FIG. 12A to FIG. 12F six inquiries filled in are shown on paper, each filled in by a different person. These six questionnaires are scanned in (step S405) and are automatically judged (step S406 described more in detail with FIG. 5B). An example of the result of this step is depicted in FIG. 13: an example of a distribution of answers made for each of the answers overlaying the scanned in questionnaire (1301). It should be possible in an apparatus incorporating the invention that per inquiry question, sometimes more than one answer could be filled in and so more than one answer per question is contributing to the distribution of answers. This is done by adding up the number of answers given for an answer location and relating the total of number of answers given for an answer location with the total number of inquiries. An example of such a question is the third question (1302) where a person could have two or more favourite colours such as yellow and blue.

For the present invention thus described, it will be obvious that the same may vary in many ways. Such variations are not a departure from scope of the invention, and all such modifications would be obvious to one skilled in the art intended to be included within the scope of the following claims.

The invention claimed is:

1. A computerized method for automatically analyzing a filled-in questionnaire, the method comprising the steps of:
   (a) providing a questionnaire having plural answer locations;
   (b) scanning with a device having a processing unit at least two copies of the questionnaire with the plural answer locations filled-in differently and complementarily in a predetermined way to define a set of answer locations, and to produce a first scan of the defined set of answer locations and a second scan of the defined set of answer locations;
   (c) automatically determining with the device having the processing unit the answer locations by comparing the first scan and the second scan;
   (d) providing another copy of the questionnaire having certain answers filled-in;
   (e) scanning with the device having the processing unit the provided another copy of the questionnaire having certain answers filled-in as a third scan; and
   (f) automatically judging with the device having the processing unit the certain answers at the determined answer locations.

2. The computerized method according to claim 1, further comprising automatically labeling every answer location as a correct answer or a wrong answer.

3. The computerized method according to claim 2, wherein the step (c) further comprises the step of selecting a label based upon the number of answer locations on the first scan and the number of answer locations on the second scan.

4. The computerized method according to claim 2, wherein the step (f) comprises the steps of:
   finding all answers on the third scan by using the answer locations, deciding per answer whether the answer is a wrong answer or a correct answer based upon the label of the answer location, and creating a questionnaire.

5. The computerized method according to claim 4, wherein the step (f) further comprises the step of presenting an improper filled in question to an operator for corrective actions.

6. The computerized method according to claim 4, wherein the step (f) further comprises the step of displaying the third scan with a correction symbol.

7. The computerized method according to claim 4, wherein the step (f) further comprises the step of displaying the third scan with a test result.

8. The computerized method according to claim 4, wherein the step (f) further comprises the steps of:
providing a relation between a test result and a test mark,
determining the test mark based upon the relation, and
displaying the third scan with the test mark.

9. The computerized method according to claim 4, wherein the step (f) further comprises the step of automatically creating a test summary, wherein the test summary comprises test results and/or test marks of a plurality of third scans.

10. The computerized method according to claim 9, wherein the step (f) further comprises the step of displaying the test summary with a part of at least one of the third scans.

11. The computerized method according to claim 1, wherein the step (c) comprises the step of automatically determining answer locations by comparing the first scan and the second scan, where one of the first and second scans is made from the questionnaire with all answers filled-in and the other of the first and second scans is made from the questionnaire with no answers filled-in.

12. The computerized method according to claim 11, wherein the step (f) further comprises the step of displaying at least one of the third scans with the distribution of answers.

13. The computerized method according to claim 11, wherein the step (f) further comprises the step of presenting an improper filled-in question to an operator for corrective actions.

14. A computer program embodied on at least one non transitory computer-readable medium, the program comprising code that when executed on a computer carry out the steps in the computerized method of claim 1.

15. An apparatus for automatically analyzing a filled-in questionnaire, the apparatus comprising a processing unit configured to:
(a) obtain first and second scanned images of at least two copies, respectively, of a questionnaire having answer locations, with the answer locations filled-in on one copy of the test questionnaire correctly and on another copy of the test questionnaire incorrectly such that the at least two copies of the test questionnaire are filled-in differently and complementarily in a predetermined way to define a set of answer locations;
(b) automatically determine the answer locations by comparing the first scan and the second scan;
(c) obtain a third scanned image of the test questionnaire having certain answers filled-in; and
(d) automatically judge the correctness of the certain answers at the determined answer locations with respect to the first scan and the second scan.

16. The apparatus of claim 15, wherein the processing unit is further configured to:
automatically label every answer location as a correct answer or a wrong answer.

17. The apparatus of claim 16, wherein the processing unit is further configured to:
find all answers on the third scanned image by using the answer locations,
decide per answer whether the answer is a wrong answer or a correct answer based upon the label of the answer location, and
create a corrected questionnaire.

18. The apparatus of claim 15, wherein the processing unit is further configured to automatically determine answer locations by comparing the first scanned image and the second scanned image, where one of the first and second scanned images is made from the questionnaire with all answers in filled-in and the other of the first and second scanned images is made from the questionnaire with no answers in filled-in.

19. The apparatus of claim 15, wherein the apparatus is incorporated in a digital copier.

20. The computerized method for automatically analyzing a filled-in questionnaire of claim 1, wherein the filled-in answer locations of the two copies together form the entire set of answer locations.

21. The apparatus for automatically analyzing a filled-in questionnaire of claim 15, wherein the filled-in answer locations of the two copies together form the entire set of answer locations.

22. The computerized method for automatically analyzing a filled-in questionnaire of claim 1, wherein the answer locations are uniquely defined and unambiguously found by comparing the first scan and the second scan.

23. The apparatus for automatically analyzing a filled-in questionnaire of claim 15, wherein the answer locations are uniquely defined and unambiguously found by comparing the first scan and the second scan.

24. The computerized method according to claim 2, wherein the predetermined way comprises aligning the first scan, the second scan and the third scan, removing equal information between the first scan and the second scan from both the first scan and the second scan, identifying on the first scan and the second scan the answer locations and labeling the answer locations differently based upon being part of a first set or a second set.

\* \* \* \* \*